United States Patent [19]

Luria

[11] Patent Number: 5,695,240
[45] Date of Patent: Dec. 9, 1997

[54] CHAIR CONSTRUCTION AND PASSENGER AIRCRAFT COMPARTMENT INCLUDING SAME

[75] Inventor: David Luria, Tel-Aviv, Israel

[73] Assignee: Fuselage Engineering Services, Tel Aviv, Israel

[21] Appl. No.: 645,241

[22] Filed: May 13, 1996

[51] Int. Cl.[6] .................................................. A47B 39/00
[52] U.S. Cl. ........................ 297/163; 297/173; 297/188.07
[58] Field of Search ........................... 297/163, 173, 297/188.07, 188.04, 188.21, 248, 188.05, 188.01

[56] References Cited

U.S. PATENT DOCUMENTS

| 645,098 | 3/1900 | Holiman et al. | 297/188.05 X |
| 1,893,458 | 1/1933 | Tatum | 297/188.07 X |
| 3,596,987 | 8/1971 | Wilson et al. | 297/188.07 X |
| 3,773,381 | 11/1973 | Brennan | 297/163 X |
| 4,511,178 | 4/1985 | Brennan | 297/163 X |
| 4,726,621 | 2/1988 | Müller | 297/188.04 X |
| 5,169,209 | 12/1992 | Beroth | 297/163 X |
| 5,507,556 | 4/1996 | Dixon | 297/188.04 X |

FOREIGN PATENT DOCUMENTS 401253  8/1909  France .................................. 297/163

Primary Examiner—Milton Nelson, Jr.

[57] ABSTRACT

A chair construction for passenger vehicles having a table pivotally mounted to the backrest to either a folded vertical position against the backrest or to an operative horizontal position for use by the occupant of the seat directly behind the respective seat in the line, characterized in that an article storage compartment is carried by the table such that the article storage compartment minimizes interference with the occupant of the behind seat in the folded vertical position of the table thereby providing more comfort and/or enabling closer spacing of rows of the chairs one behind the other.

9 Claims, 1 Drawing Sheet

CHAIR CONSTRUCTION AND PASSENGER AIRCRAFT COMPARTMENT INCLUDING SAME

FIELD AND BACKGROUND OF THE INVENTION

The present invention relates to a chair construction for passenger vehicles having a plurality of rows of seats closely spaced one behind the other. The invention is particularly useful for passenger aircraft compartments, and is therefore described below with respect to this application.

The revenue-producing capability of passenger aircraft is directly related to the number of passengers that can be carried by the aircraft in a relatively comfortable manner. A limiting factor on the closeness that seats may be spaced one behind the other is the need to provide adequate leg room for the seat occupants. Thus, a saving of even one or two centimeters between rows of seats in a long aircraft, when multiplied by the number of rows in the aircraft, can permit the inclusion of one or more additional rows, thereby significantly increasing the revenue-producing capability of the aircraft.

OBJECT AND BRIEF SUMMARY OF THE INVENTION

An object of the present invention is to provide a chair construction for passenger vehicles which enables closer spacings of the rows of seats in the passenger compartment thereby increasing the revenue-producing capability of the vehicle, or which provides more comfort to the passengers with the existing spacings of the rows of seats.

According to the present invention, there is provided a chair for passenger vehicles to include a plurality of rows of chairs closely spaced one behind the other, the chair being constructed with a base to be secured to the floor of the passenger vehicle, a seat to receive an occupant, a backrest for the occupant, a table pivotally mounted to the backrest to a folded vertical position against the backrest and to an operative horizontal position for use by the occupant of the seat directly behind the respective seat in the row, and an article storage compartment for use by the occupant of the behind seat for storing articles. The article storage compartment is carried by the table on the side thereof to face the behind seat occupant in the folded vertical position of the table, and is capable of enclosing and storing articles within the compartment in both the folded vertical position and the operative horizontal position of the table. In such an arrangement, the article storage compartment minimizes interference with the occupant of the behind seat in the folded vertical position of the table thereby providing more comfort to the behind seat occupant or enabling closer spacings of rows of the chairs one behind the other.

Such a chair construction differs from the present construction wherein the article storage compartment is generally provided in the bottom section of the chair backrest near the legs of the occupant of the behind seat. By relocating the article storage compartment so that it is carried by the table as set forth above, not only does this not detract from the accessibility of the compartment to the occupant of the behind seat since the compartment is now located closer to eye and arm level, but more importantly, it does not interfere at all with the legs of the behind seat occupant and therefore permits closer spacings of the chairs in the rows one behind the other.

While such a chair construction is advantageous in various types of passenger vehicles (e.g., busses), it is especially advantageous in passenger aircraft where the passenger-carrying capacity of the vehicle is a critical factor in the economic feasibility of the vehicle.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
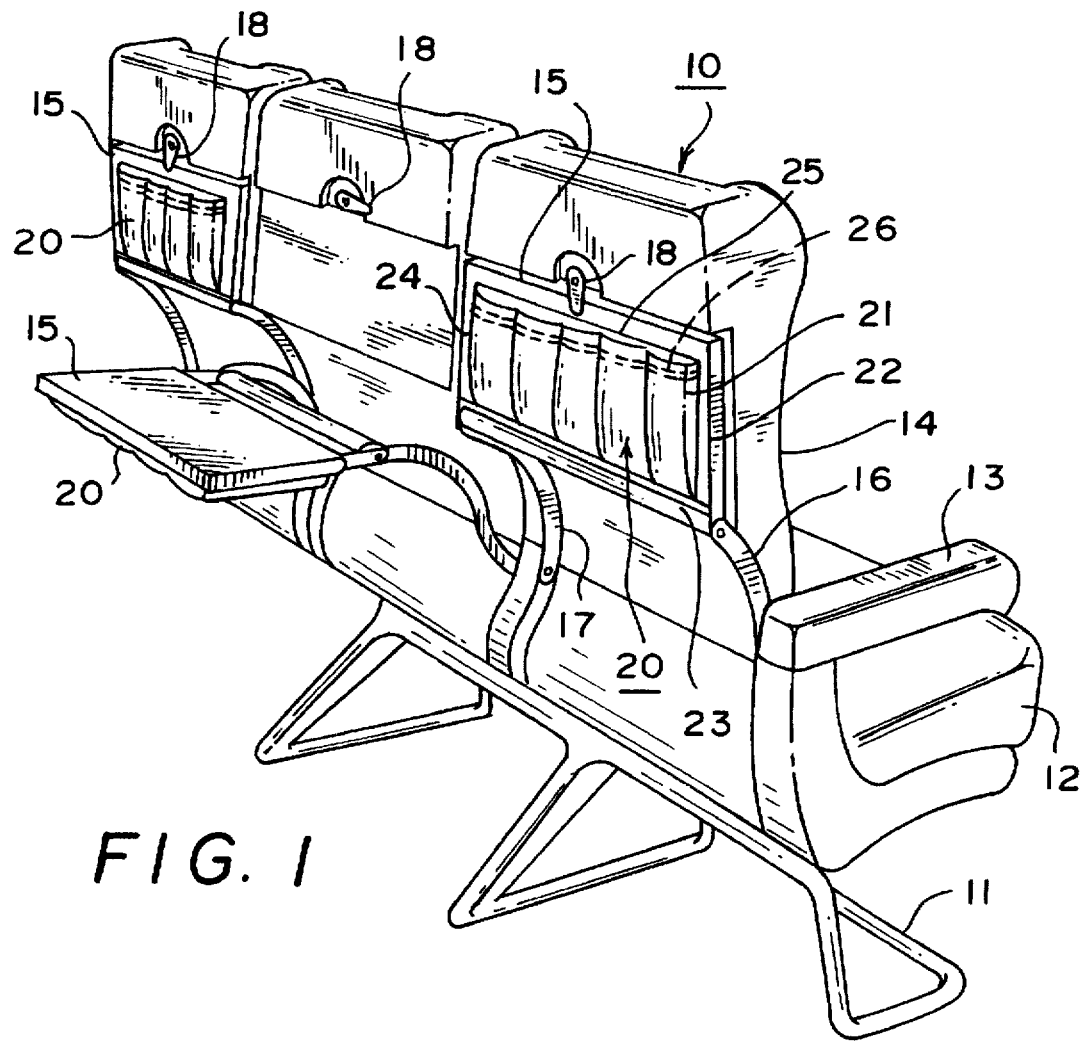
FIG. 1 is a three-dimensional view illustrating one row of chairs constructed in accordance with the present invention.

The chair construction illustrated in the drawings is designed for a passenger aircraft having a plurality of rows of chairs closely spaced one behind the other. For purposes of example, FIG. 1 illustrates a row of three chairs, and FIG. 2 illustrates two such rows with each chair in each row closely spaced behind the chair in the preceding row.

Each chair, generally designated 10, may be of a basically known construction to include a base 11 for securing the chair to the floor of the aircraft, a seat 12 to receive an occupant, a pair of armrests 13, and a backrest 14. Each chair further includes a table 15 pivotally mounted to the backrest by a pair of arms 16, 17, to either a folded vertical position against the backrest (chair 10a, FIG. 2), or to an operative horizontal position (chair 10b, FIG. 2) for use by the occupant of the seat directly behind the respective seat. Each chair further includes a pivotal retainer member 18 engageable with the upper edge of the table 15 to retain the table in its folded vertical position.

Figure 2:
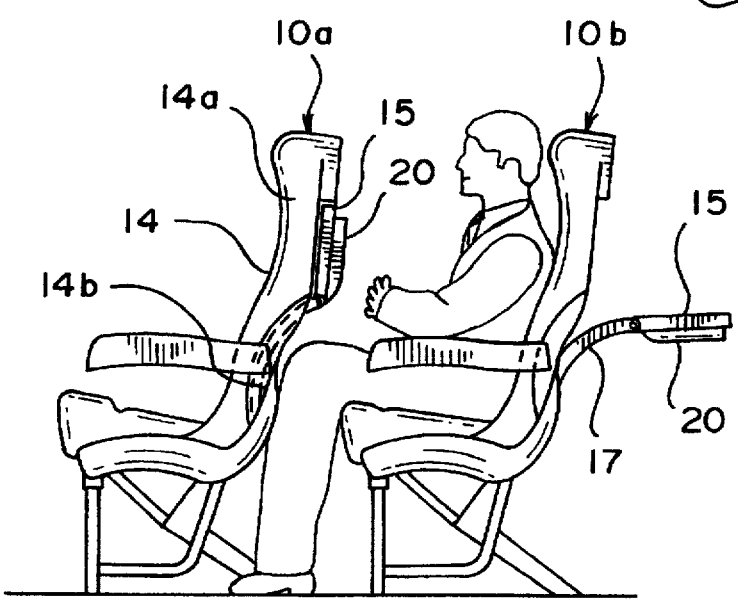
FIG. 2 is a side elevational view illustrating two rows of such chairs.

As shown particularly in FIG. 2, the table 15 is pivotally mounted to the upper section 14a of the backrest 14. The lower section 14b of the backrest is displaced forwardly of the upper section 14a.

In the prior art chair construction, the lower section 14b of the backrest 14 is provided with an article storage compartment for use by the occupant of the chair directly behind the respective chair. As noted above, this adds to the rearward dimension of the lower backrest section 14b, and thereby limits the closeness that the behind chair (10b, FIG. 2) may be spaced from the respective chair (10a) and still provide comfortable leg room for the occupant of the behind chair (10b).

According to the present invention, the chair 10 illustrated in the drawings is also provided with an article storage compartment, generally designated 20, but in this case the compartment is carried by the table 15 on the side thereof to face the occupant of the behind chair as shown in FIG. 2.

Article storage compartment 20 is of rectangular configuration, slightly smaller than the size of the table 15 to which it is secured. This compartment comprises a flexible panel 21, preferably of a fabric material, secured along its three circumferential edges 22, 23, 24, to the table 15, but open at its top 25 to permit access into the compartment. An elastic cord 26 is included along the top edge of the flexible panel 21 to yieldably urge the panel to its closed position, but to permit the panel to be opened by the application of a relatively small force in order to introduce articles into the compartment or to remove articles from the compartment.

As shown in FIG. 1, the height of panel 21 is slightly shorter than the height of the table 15 to which it is secured. The arrangement is such that the open top 25 of the article storage compartment 20 defined by panel 21 is not engaged by the pivotal retainer member 18 when that member is in its operative position retaining the table in its folded vertical position.

Thus, when the table 15 is in its folded vertical position (as shown by the table in chair 10a, FIG. 2), the article storage compartment 20 is very conveniently accessible to the occupant of the behind chair (chair 10b) since the compartment is closer to the eye and arm level of the occupant as compared to the conventional arrangement wherein the article storage compartment is in the lower backrest section 14b of the chair. Moreover, since the lower backrest section 14b of the chair is now devoid of the article storage compartment, its dimension in the rearward direction is reduced. This enables the behind chair (10b) to be spaced closer to the front chair (10a) by this reduction in dimension, usually at least several centimeters, while providing the same leg room for the occupant for the behind chair (chair 10b).

Such an arrangement therefore enables the chairs of each row to be more closely spaced behind each other. When this saving in space is multiplied by the number of rows in the aircraft, a substantial savings in space is produced sufficient to enable an additional row or more of chairs to be added to the passenger compartment.

While the invention has been described with respect to one preferred embodiment, it will be appreciated that this is set forth merely for purposes of example, and that many variations may be made. For example, the article storage compartment may be provided within the table or on the side of the table facing the backrest. In addition, the invention can be embodied in the original installation or in a retrofit. Many other variations, modifications and applications of the invention will be apparent.

I claim:

1. A chair for passenger vehicles having a plurality of rows of such chairs closely spaced one behind the other, said chair comprising: a base to be secured to the floor of the passenger vehicle, a seat to receive an occupant, a backrest for the occupant, a table pivotally mounted to the backrest for mounting to a folded vertical position against the backrest and to an operative horizontal position for use by an occupant of the seat directly behind the respective seat in the row, and an article storage compartment for use by the occupant of said behind seat for storing articles; said article storage compartment comprising a flexible panel secured along its circumferential edges to said table but open at its top edge to permit access into said compartment; said article storage compartment being carried by said table on the side thereof to face said behind seat occupant in the folded vertical position of the table and being constructed to enclose and store articles within the compartment in both the folded vertical position and the operative horizontal position of the table, whereby the article storage compartment minimizes interference with the occupant of said behind seat in the folded vertical position of the table thereby providing more comfort to said behind seat occupant and enabling closer spacings of rows of said chairs one behind the other.

2. The chair according to claim 1, wherein said backrest includes an upper section pivotally mounting said table and the article storage compartment carried thereby, and a lower section between said upper section and said seat; said lower section extending forwardly of the upper section of the respective chair backrest and being devoid of an article storage compartment, to thereby better accommodate the legs of the occupant of said behind seat when there is close spacing of rows of said chairs one behind the other.

3. The chair according to claim 1, wherein said top edge of the flexible panel includes an elastic cord yieldably urging the flexible panel to a closed position.

4. The chair according to claim 1, wherein said flexible panel is of a fabric material.

5. The chair according to claim 1, wherein said backrest further includes a pivotal retainer member engageable with the upper edge of the table in the folded vertical position of the table for retaining the table in said folded vertical position; the open top edge of the article storage compartment being slightly below said pivotal retainer member so as not to be engaged thereby in the folded vertical position of the table.

6. A passenger vehicle including a passenger compartment comprising a plurality of rows of chairs each constructed as defined in claim 1.

7. The passenger vehicle according to claim 6, wherein said vehicle is a passenger aircraft.

8. A chair for passenger vehicles having a plurality of rows of chairs closely spaced one behind the other, said chair comprising:

a base to be secured to the floor of the passenger vehicle;

a seat to receive an occupant;

a backrest for the occupant;

a table pivotally mounted to the backrest for movement to a folded vertical position against the backrest, and to an operative horizontal position for use by an occupant of the seat directly behind the respective seat in the row;

and an article storage compartment for use by the occupant of said behind seat for storing articles;

said article storage compartment including a flexible panel secured along its circumferential edges to said table on the side thereof to face said behind seat occupant in the folded vertical position of the table; said flexible panel being open at its top edge to permit access into said compartment;

said top edge of the flexible panel including an elastic cord yieldably urging the flexible panel to a closed position;

and a pivotal retainer member engageable with the upper edge of the table in the folded vertical position of the table for retaining the table in said folded vertical position, the open top edge of said article storage compartment being slightly below said pivotal retainer member so as not to be engaged thereby in the folded vertical position of the table.

9. The chair according to claim 8, wherein said backrest includes an upper section pivotally mounting said table and the article storage compartment carried thereby, and a lower section between said upper section and said seat; said lower section extending forwardly of the upper section of the respective chair backrest and being devoid of an article storage compartment, to thereby better accommodate the legs of the occupant of said behind seat when there is close spacing of rows of said chairs one behind the other.

\* \* \* \* \*